S. DUPRE, Jr.
TAP.
APPLICATION FILED OCT. 11, 1913.

1,095,716.

Patented May 5, 1914.

WITNESSES:
G. C. Fairbanks.
H. D. Cutter.

INVENTOR.
Stephen Dupre, Jr.,
BY
Webster & Co.,
ATTORNEYS.

COLUMBIA PLANOGRAPH CO., WASHINGTON, D. C.

UNITED STATES PATENT OFFICE.

STEPHEN DUPRE, JR., OF SPRINGFIELD, MASSACHUSETTS.

TAP.

1,095,716.  Specification of Letters Patent.  Patented May 5, 1914.

Application filed October 11, 1913. Serial No. 794,618.

*To all whom it may concern:*

Be it known that I, STEPHEN DUPRE, Jr., a citizen of the United States of America, residing at Springfield, in the county of Hampden and State of Massachusetts, have invented a new and useful Tap, of which the following is a specification.

My invention relates to improvements in tools used for cutting internal screw-threads, and more particularly to hand-operated taps, and consists of a tap equipped with a screw-threaded shank that has a thread of the same pitch as is that of the tap threads or cutting elements of the tap, which shank has thereon or is provided with a work-engaging member, all as hereinafter set forth.

In tapping holes by hand it is very difficult, not to say impossible, to keep the tap perpendicular to the plane of the work, so as to produce an opening with screw-threaded sides the axis of which threaded opening is absolutely perpendicular to the aforesaid plane, and it not infrequently occurs that some of the threads cut by the tap are stripped, and the primary object of my invention is to produce a tap or provide a tap with means wherewith or whereby both of these difficulties are entirely removed or avoided. This is accomplished by reason of the fact that the work-engaging member is tight against the work all the time, traveling toward the tap cutters as fast as the latter enter the work, and consequently compels the tap to move in a line perpendicular to the plane of the said work; and at the same time the tap is relieved of much of the strain to which it is ordinarily subjected.

Other objects and advantages will appear in the course of the following description.

I attain the objects and secure the advantages of my invention by the means illustrated in the accompanying drawings, in which—

Figure 1:
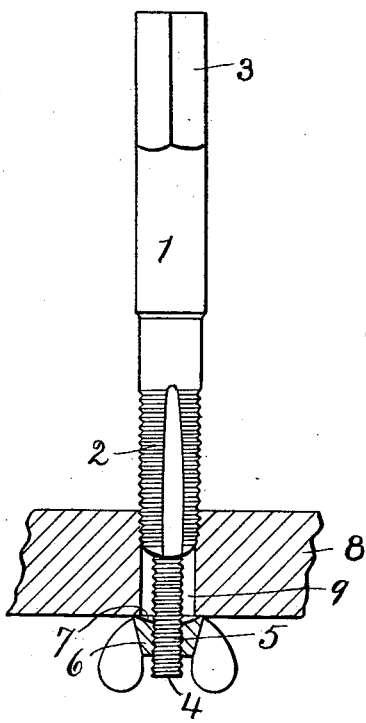
Figure 2:
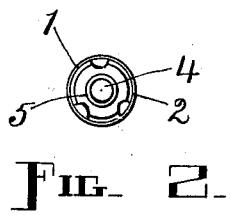

Figure 1 is a side elevation and partial section of a tap which embodies a practical form of my invention, showing the application of the same to a piece of work; Fig. 2, an elevation of the working end of said tap without the nut, and, Fig. 3, a side elevation and partial section of a modified form of construction.

Similar figures refer to similar parts throughout the several views.

In all three of the views a tap, comprising a shank 1 and cutter 2, is shown. Thus far the tap does not differ in any essential particular from an ordinary implement for the same purpose. The head of the shank 1 is made angular in cross-section, as shown at 3, to afford a bearing for a tap wrench.

In what is believed to be the preferred construction of the invention, that illustrated in the first two views, I extend the cutter 2 or provide the same with an axial projection, stud or post 4, beyond the leading terminal of said cutter, and provide such post with a screw-thread 5 having the same pitch as that of the cutter 2, and also the same direction. Fitted to the post 4 is a nut 6, which has its inner face concaved, as represented at 7, to receive the leading end of the cutter 2 and thus enable said cutter to pass clear through the work and complete the thread cut thereby. Preferably the nut 6 is winged to make of it a thumb nut.

In Fig. 1 appears in section a piece of work 8 which has an opening 9 therein that is in the act of being tapped. In practice, the post 4 is passed through the opening 9, and the nut 6 is screwed on to the terminal of said post that protrudes from said opening. The nut 6 is screwed tightly against one side of the piece of work or block 8, drawing the leading end of the cutter 2 into close contact with said block on the other side thereof or at the opposite end of the opening 8 over or under which said nut is placed, and thus said block at the beginning is embraced between said cutter and said nut. Since the plane of the work-bearing portion of the nut 6 is at right-angles to the axis of the tap and its parts, the post 4 occupies the center of the opening 9, with the axis of the two coinciding, and, since the axis of said post is a continuation of the axis of the cutter 2, the latter can not deviate from a direct course during the tapping operation, provided said nut is actuated toward said cutter as fast as the latter advances, as must be the case owing to the fact that the pitch of the thread 5 is the same as that of the threads at 2. When the nut 6 is properly set against the block 8, a wrench is applied to the bearing 3 and the shank 1 with the cutter 2, together with the post 4, is rotated in the proper direction to cause said cutter to enter the opening 9 and cut threads in the sides thereof, the tapping operation itself being no different from that performed by any ordinary tap. As the cutter 2 advances, the post 4 also advances through the nut 6 and retains said nut in its original position against the block 8, with the result that said shank and nut relieve said cutter of much strain, cause it to move longitudinally always in a straight line, and obviate any liability, at any stage of the operation, on the part of the cutter, of stripping the threads formed thereby, as hereinbefore observed. The presence in the nut 6 of the concavity or recess 7 enables the cutter 2 to pass clear through the opening 9 and complete the thread in said opening. At the end of the operation the nut 6 is unscrewed from the post 4 and the cutter 2 turned out of the now threaded opening 9. In this first construction all of the parts, with the exception of the nut, are by preference integral with each other.

Figure 3:
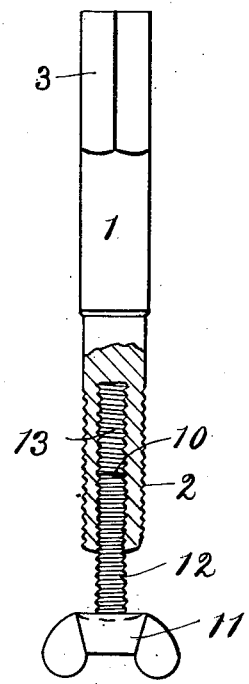

Instead of employing a fixed post or extension at the leading end of the cutter 2, with a movable nut thereon, I may employ a movable extension or post 10 having thereon a fixed nut or head 11, such post being tapped into the cutter portion of the shank 1, as shown in Fig. 3. The member 10 and the bore therefor in the shank 1 are respectively provided with screw-threads 12 and 13, the pitch of which in each case corresponds with that of the cutter 2. The direction of the screw-threads 12 is also the same as that of the cutter threads. The head 11 is recessed in the same way and for the same purpose as is the nut 6. The operation of the modified construction is the same as in the other case, except that the cutter, while in the act of tapping a hole, advances on the extension or post 12 toward the head 11, instead of carrying with it the screw-threaded extension and causing the latter to advance through the work-engaging member or nut.

While the second or modified construction is entirely practicable and quite as efficient perhaps as the other, it is believed that a stronger and more durable device is produced when a fixed extension, for an independently movable nut, is provided at the leading end of the cutter, in the manner substantially as shown in Fig. 1.

Various changes in the form, proportions, and details of construction, other than are shown and described, may be resorted to without departing from the principle or exceeding the scope of this invention, except as set forth in the claims.

What I claim as my invention, and desire to secure by Letters Patent, is—

1. As a new article of manufacture, a tap provided at the cutter terminal with an extension having a screw-thread of the same pitch as that of the cutter, and a work-engaging member on said extension and adapted to bear only on the outside of the work.

2. As a new article of manufacture, a tap provided at the cutter terminal with an extension having a screw-thread of the same pitch as that of the cutter, and a work-engaging member on said extension, the surface of said member, which is contiguous to the work, being recessed to receive the leading end of said cutter, and said work-engaging member being adapted to bear on the outside of the work.

3. As a new article of manufacture, a tap provided at its cutter terminal with a post having a screw-thread of the same pitch as that of the cutter, the diameter of such post being smaller than that of said cutter, and a work-engaging member carried by said post and adapted to bear only on the outside of the work.

4. As a new article of manufacture, a tap provided at the cutter terminal with a fixed post having a screw-thread of the same pitch as that of the cutter and being of less diameter than said cutter, and a work-engaging member carried by said post, said member having a recess therein to receive the leading end of said cutter, and being adapted to bear only on the outside of the work.

5. As a new article of manufacture, a tap provided at the cutter terminal with a fixed post of less diameter than the cutter and having a screw-thread of the same pitch as that of said cutter, and a nut threaded to said post and adapted to bear on the outside of the work.

6. As a new article of manufacture, a tap provided at the cutter terminal with a fixed post of less diameter than the cutter and having a screw-thread of the same pitch as that of said cutter, and a nut threaded to said post, said nut being adapted to bear on the outside of the work and recessed to receive the leading end of said cutter.

STEPHEN DUPRE, Jr.

Witnesses:
  F. A. CUTTER,
  A. C. FAIRBANKS.

Copies of this patent may be obtained for five cents each, by addressing the "Commissioner of Patents, Washington, D. C."